United States Patent [19]
Felknor et al.

[11] Patent Number: 5,163,357
[45] Date of Patent: Nov. 17, 1992

[54] POPCORN POPPER WITH FLOATING STIRRING SYSTEM

[75] Inventors: Wilson A. Felknor, Knoxville, Tenn.; Michael L. Williams, Monon, Ind.

[73] Assignee: Felknor International, Inc., White, Ind.

[21] Appl. No.: 716,221

[22] Filed: Jun. 17, 1991

[51] Int. Cl.$^5$ .............................................. A23L 1/18
[52] U.S. Cl. ..................... 99/323.5; 99/348; 366/252; 366/326; 366/331
[58] Field of Search ..................... 99/323.4, 323.5, 348; 366/244-248, 252-254, 281, 283, 284, 326, 331, 343, 347

[56] References Cited

U.S. PATENT DOCUMENTS

| | | | |
|---|---|---|---|
| 110,916 | 1/1871 | Houcke . | |
| 240,448 | 4/1881 | Morton | 366/343 |
| 312,612 | 2/1885 | Copeland . | |
| 782,126 | 2/1905 | Gilmore | 366/247 |
| 798,570 | 8/1905 | Dalby | 366/248 |
| 876,786 | 1/1908 | Emmer | 366/331 |
| 1,444,244 | 2/1923 | Grossenbacher | 366/248 |
| 1,475,081 | 11/1923 | Parks | 366/248 |
| 1,617,643 | 2/1927 | Kriete | 366/326 |
| 1,642,531 | 9/1927 | Barnard . | |
| 1,689,265 | 10/1928 | Walker . | |
| 1,974,611 | 9/1934 | Gundelfinger | 366/326 |
| 2,113,041 | 4/1938 | Benson . | |
| 2,254,271 | 9/1941 | Cretors | 99/348 |
| 2,441,941 | 5/1948 | Shafter . | |
| 2,495,865 | 1/1950 | Perkins | 99/348 |
| 2,586,347 | 2/1952 | Kloster | 99/348 |
| 2,604,030 | 7/1952 | Cretors | 99/348 |
| 2,778,613 | 1/1957 | Long | 366/248 |
| 3,112,917 | 12/1963 | Woerner | 99/348 |
| 3,357,685 | 12/1967 | Stephens | 99/348 |
| 4,202,256 | 5/1980 | Brooks | 99/323.5 |
| 4,576,089 | 3/1986 | Chauvin | 99/348 |

Primary Examiner—Harvey C. Hornsby
Assistant Examiner—Mark Spisich
Attorney, Agent, or Firm—Pitts and Brittian

[57] ABSTRACT

A popcorn popper (10) for more effectively popping popcorn by agitating the popcorn during the heating process with a floating stirring system, the floating stirring system being designed to avoid jamming while the popcorn is being agitated and popped and to draw unpopped kernels to the center of the popping surface, including those kernels which tend to remain about the periphery. The popcorn popper (10) includes a popcorn receptacle (12) into which unpopped kernels are placed for popping. The lid assembly (14) includes a pair of doors (54 and 56) attached to a spine (40), the spine (40) being releasably secured to the popcorn receptacle (12). A stirring assembly (16) is provided for agitating the popcorn in the popcorn receptacle (12) and includes a handle (80) for gripping the popper (10), a cooperating drive shaft (94) and stirring shaft (124), and a floating stirring rod (138) for engaging the popcorn kernels, the floating stirring rod (138) being driven by the cooperating shafts (94 and 124). The floating stirring rod (138) is designed to push unpopped kernels toward the center of the popcorn receptacle (12) and to prevent unpopped kernels from remaining about the periphery.

16 Claims, 4 Drawing Sheets

POPCORN POPPER WITH FLOATING STIRRING SYSTEM

TECHNICAL FIELD

This invention relates to the field of popcorn poppers. More specifically it relates to an improved popcorn popper with a floating stirring system to prevent burning of the popcorn and jamming of unpopped kernels in the popcorn popper.

BACKGROUND ART

In the field of popcorn popping, it is well known that the most desirable popcorn is popped at a high temperature. It is also well known that popcorn kernels which remain in contact with such a temperature will burn and such burned kernels will not pop. Therefore, it is well known that the popcorn kernels must be agitated to prevent individual kernels from burning, the agitation preventing both popped and unpopped kernels from sticking to the bottom surface of the cooking vessel. It is also known that such agitation inhibits the unpopped kernels to fall to the bottom as other kernels pop and move toward the top of the vessel. In order to agitate the popcorn, several methods have been used. In poppers which use heated oil to pop popcorn, these methods typically include one or more fingers which are rotated about the bottom surface of the cooking vessel or which are oscillated about the vessel bottom to sweep substantially the entire bottom surface during each repetition. Typical of the art are those devices disclosed in U.S. Pat. Nos. 110,916 issued to L. Houcke on Jan. 10, 1871; 312,612 issued to G.T. Copeland on Feb. 24, 1885; 1,642,531 issued to T.V. Barnard on Sept. 13, 1927; 1,689,265 issued to A.R. Walker on Oct. 30, 1928; 2,113,041 issued to B.A. Benson on Apr. 5, 1938; 2,441,941 issued to A.F. Shafter on May 18, 1948; and 4,202,256 issued to R.S.H. Brooks on May 13, 1980. Each of these inventions includes up to four fingers extending radially from a vertical shaft designed to rotate the fingers about the bottom of the respective popping vessel to agitate unpopped kernels, with the exception of the 312,612 and 1,689,265 patents. The 312,612 patent includes a pair of paddles spaced apart vertically, as opposed to fingers, the paddles being used to push popped corn out of the popping vessel and into a corn receptacle, as opposed to agitating unpopped kernels along the bottom surface of the vessel. The 1,689,265 invention is designed to oscillate the fingers about the bottom of the vessel at such an angle of rotation as to ensure that the entire circumference of the vessel is swept.

It is also well known that for best popping results, a consistent heat should be applied throughout the contact surface. If the contact surface is not consistently heated, popcorn in the hotter spots will pop while the cooler spots will not render as high a percentage of popping. When the popcorn is agitated across a surface which does not have a consistent temperature, the kernels will not maintain a constant temperature increase and will thus take longer to pop. In this situation there will also be a lower popping rate and a less desireable quality of the popped corn. When using a typically round popping vessel, it is known that the consistently higher temperature is toward the center of the vessel, with the outer edges showing the greatest reduction in heat. It is well known that when engaging a paddle or finger to agitate popcorn in a circular manner, tangential forces will tend to drag the popcorn to the outer edges of the vessel. The 1,642,531 patent solves this problem, but in doing so, the concavity of the vessel causes the popcorn to fall toward the center of the vessel thus being piled in the center. This is not desirable, though, because it is known that popcorn will pop more efficiently when a larger percentage of the popcorn is contacting the cooking surface.

It is desireable, then, to have a popping vessel which includes a substantially flat bottom surface on which the popcorn is placed and which is placed in contact with a heating source. It is also desireable to include an agitator for preventing the popcorn from sticking to the cooking surface and thereby burning. It is further desireable to provide a means for drawing the unpopped kernels toward the center of the cooking surface while allowing the kernels to remain in substantially a single layer. None of the devices above provide an adequate means for preventing the unpopped kernels of corn from jamming the fingers or blades while also drawing the unpopped kernels toward the center of the vessel, preventing the unpopped kernels from sticking, and providing a substantially flat heating surface with a substantially consistent temperature throughout.

Therefore, it is an object of this invention to provide a popcorn popper with a stirring mechanism designed to agitate the popcorn kernels on a flat cooking surface.

It is also an object of this invention to provide a popcorn popper with a stirring mechanism designed to prevent popcorn from jamming.

Another object of this invention is to provide a popcorn popper with a stirring mechanism which is designed to draw the unpopped kernels toward the center of the cooking surface.

Still another object of this invention is to provide a popcorn popper with a stirring mechanism which may be adjusted to an elevation slightly above the cooking surface of the popper such that popcorn kernels will be engaged as the stirring mechanism is rotated, thereby preventing kernels from sticking to the cooking surface.

Yet another object of this invention is to provide a popcorn popper which may be manufactured more cost efficiently.

DISCLOSURE OF THE INVENTION

Other objects and advantages will be accomplished by the present invention which is designed for more effectively popping popcorn by agitating the popcorn during the heating process with a floating stirring system, the floating stirring system being designed to avoid jamming while the popcorn is being agitated and popped and to draw unpopped kernels to the center of the popping surface, including those kernels which tend to remain about the periphery. The popcorn popper of the present invention includes a substantially flat-bottomed popcorn receptacle into which unpopped kernels are placed for popping. A lip is defined by the upper portion of the receptacle wall and is dimensioned to receive a lid assembly.

The lid assembly is releasably secured to the popcorn receptacle for retaining the heat used for popping the corn and for retaining the popped corn. In the preferred embodiment, the lid assembly includes a spine and a pair of oppositely disposed doors. The doors are hingeably attached to the spine and are dimensioned to substantially cover the opening of the popcorn receptacle. In the preferred embodiment, the doors include at least one vent for venting steam from the popcorn vessel during popping. To assist in opening the doors, each is provided with a handle about the outer portion. At least one raised portion is provided to strengthen the doors against unselected bending. In the preferred embodiment, at least one of the doors is provided with a resilient latch to prevent the door from opening as the popcorn popper is tilted for the removal of popcorn. The lid assembly is selectively secured to the popcorn receptacle with a pair of oppositely disposed resilient latches. In the preferred embodiment the latches are attached to either end of the spine. In the preferred embodiment, at least one latch includes an extended section to be used as a lever to assist in the selective removal and engagement of the lid assembly.

A stirring assembly is provided for agitating the popcorn in the popcorn receptacle. The stirring assembly includes a handle for gripping the device while popping corn or transporting the popcorn popper. A cooperating drive shaft and stirring shaft are designed such that the drive shaft may be used in a crank fashion to generate torque for turning the stirring shaft. In the preferred embodiment, the drive shaft includes a bevel pinion at one end which cooperates with a bevel gear attached to one end of the stirring shaft. The stirring shaft is journaled within the spine of the lid assembly and extends to proximately the bottom of the popcorn receptacle. The stirring rod is provided to agitate the popcorn kernels and inhibit unpopped kernels to fall to the bottom surface of the popcorn receptacle. The stirring rod is pivotally connected to the stirring shaft proximate the bottom of the popcorn receptacle such that the stirring rod is restrained from movement along the longitudinal axis of the stirring rod, while allowing vertical rotation of the stirring rod. The stirring rod is configured so as to prevent the stirring rod from jamming, to push unpopped kernels to the center of the popcorn receptacle, and to prevent popcorn kernels from remaining along the periphery. The stirring rod is fabricated such that the popcorn kernels will not jamb the stirring rod but will deform the stirring rod such that a kernel may pass underneath, the stirring rod then resuming its original shape and moving the kernels on a subsequent rotation.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
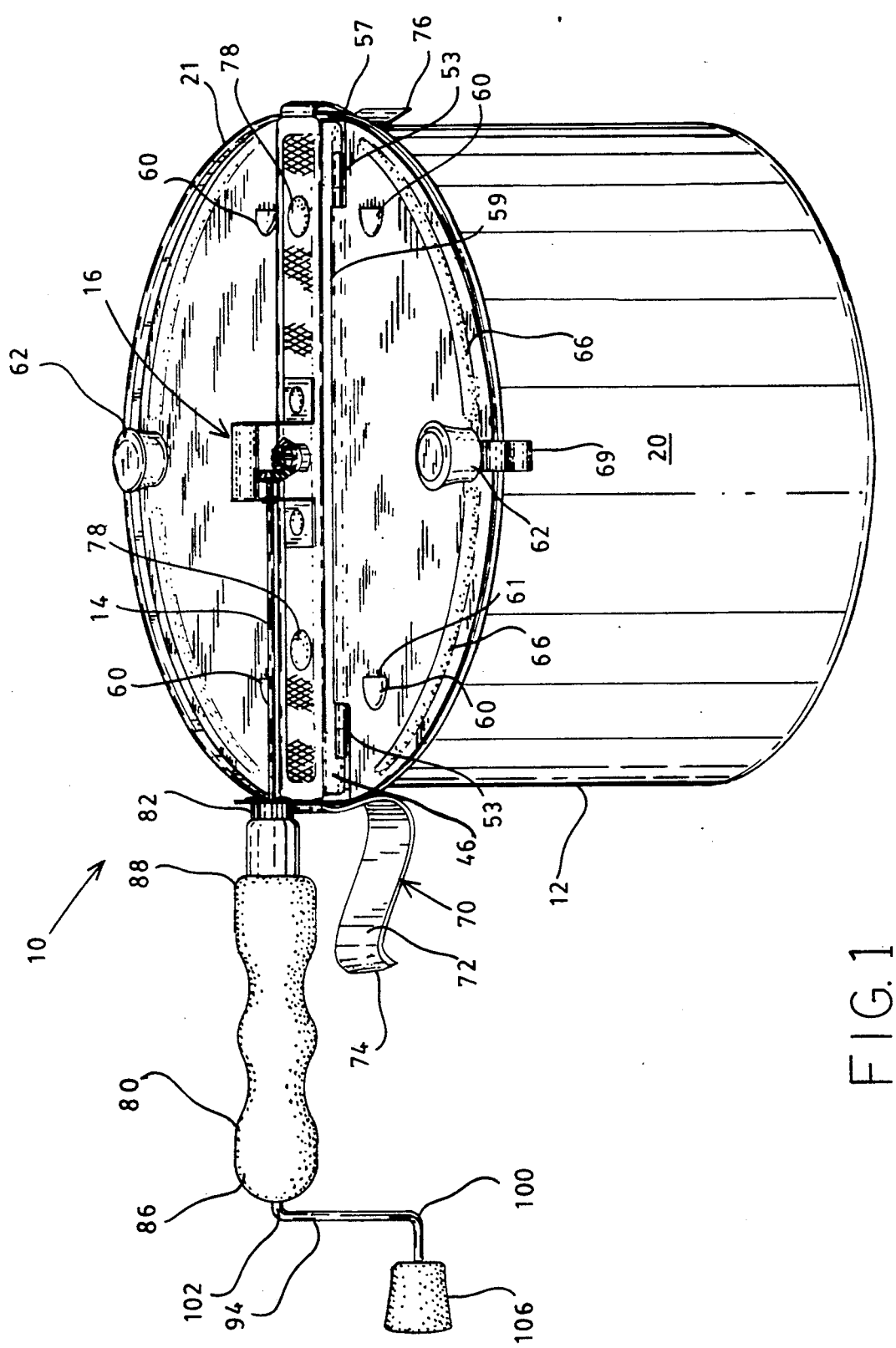
FIG. 1 is a perspective view of the popcorn popper constructed in accordance with several features of the present invention showing.
Figure 2:
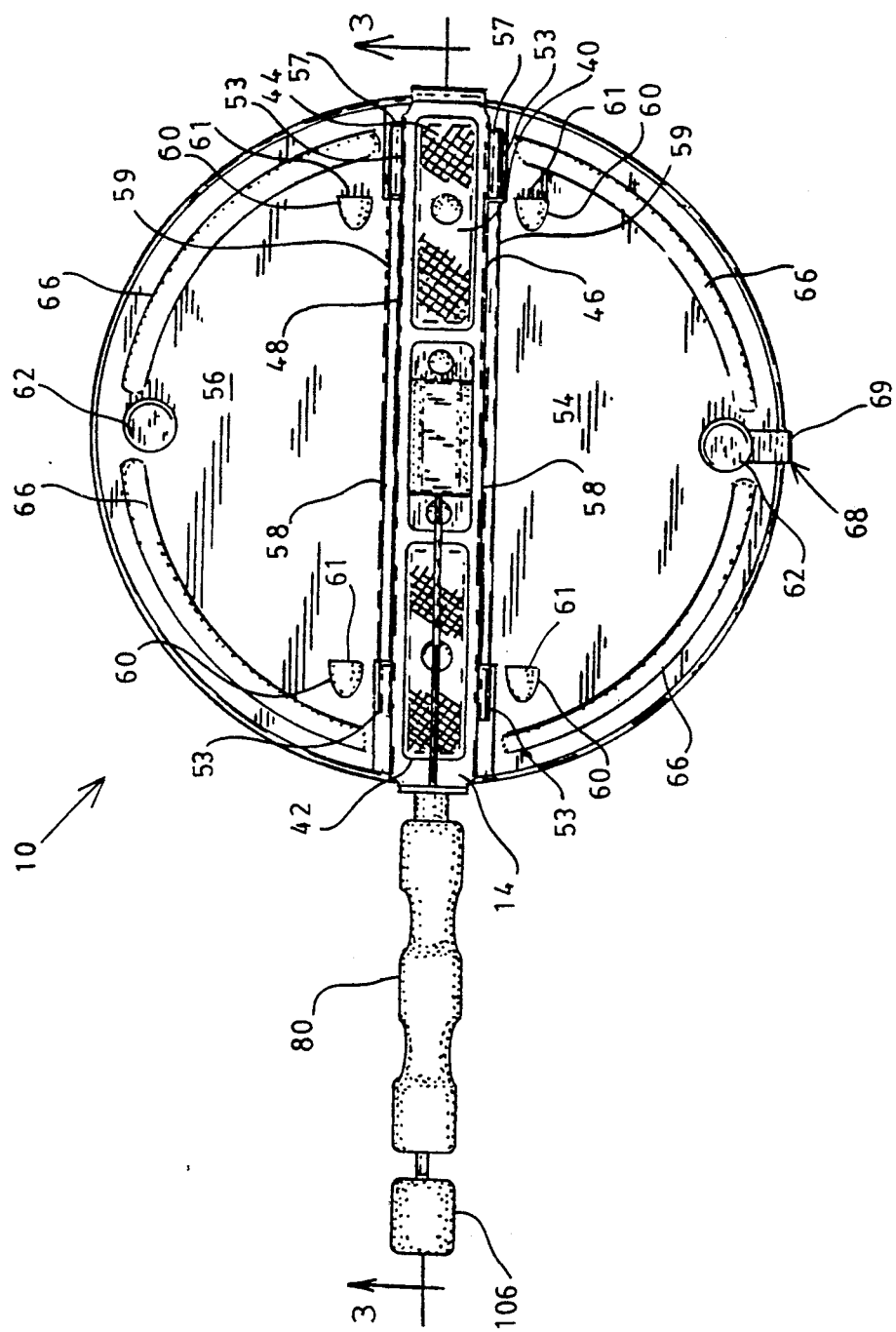
FIG. 2 is a top elevation view of the popcorn popper of FIG. 1.
Figure 3:
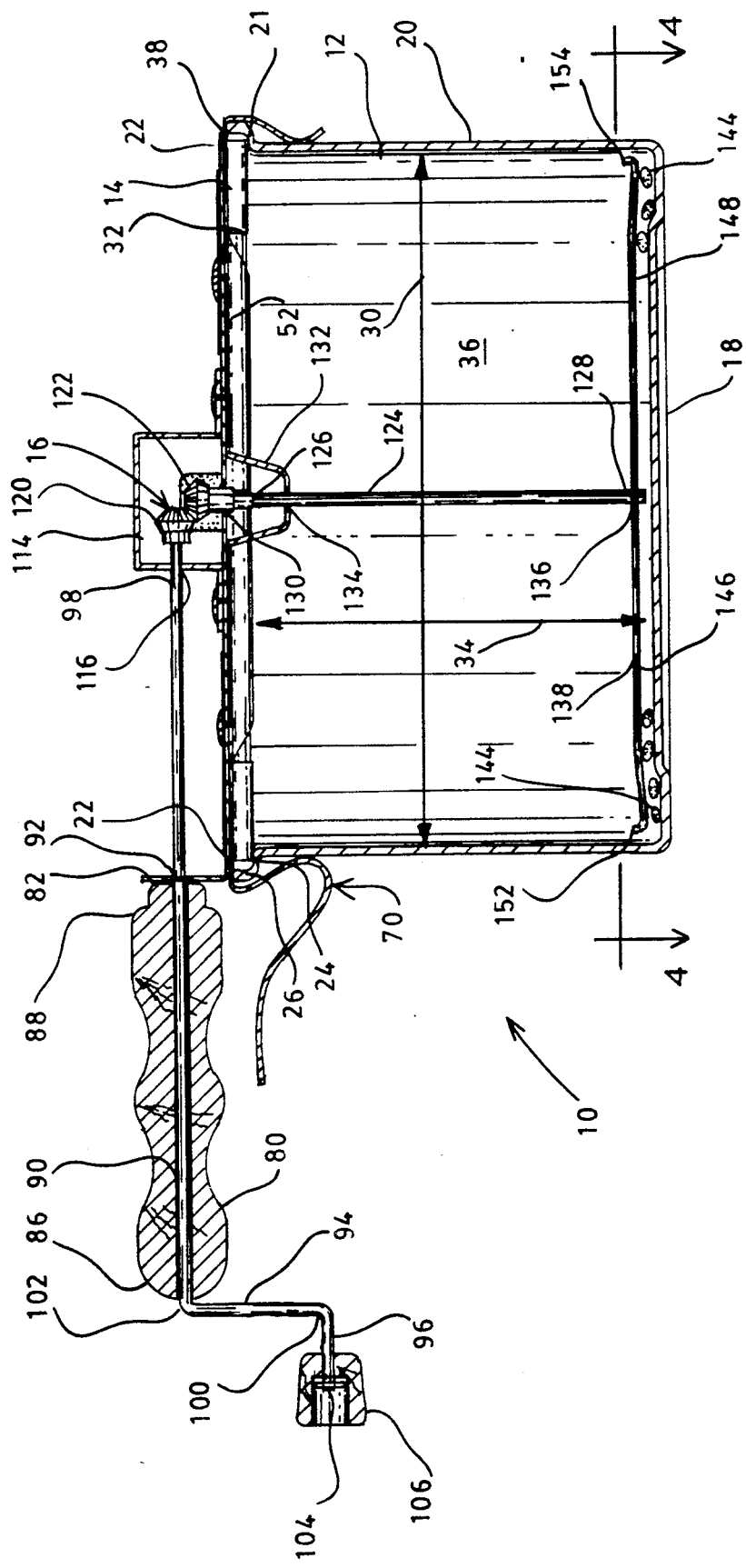
FIG. 3 illustrates a side elevation view, in section, taken at 3—3 of FIG. 2, showing the floating stirring rod engaging unpopped kernels and floating over others.
Figure 4:
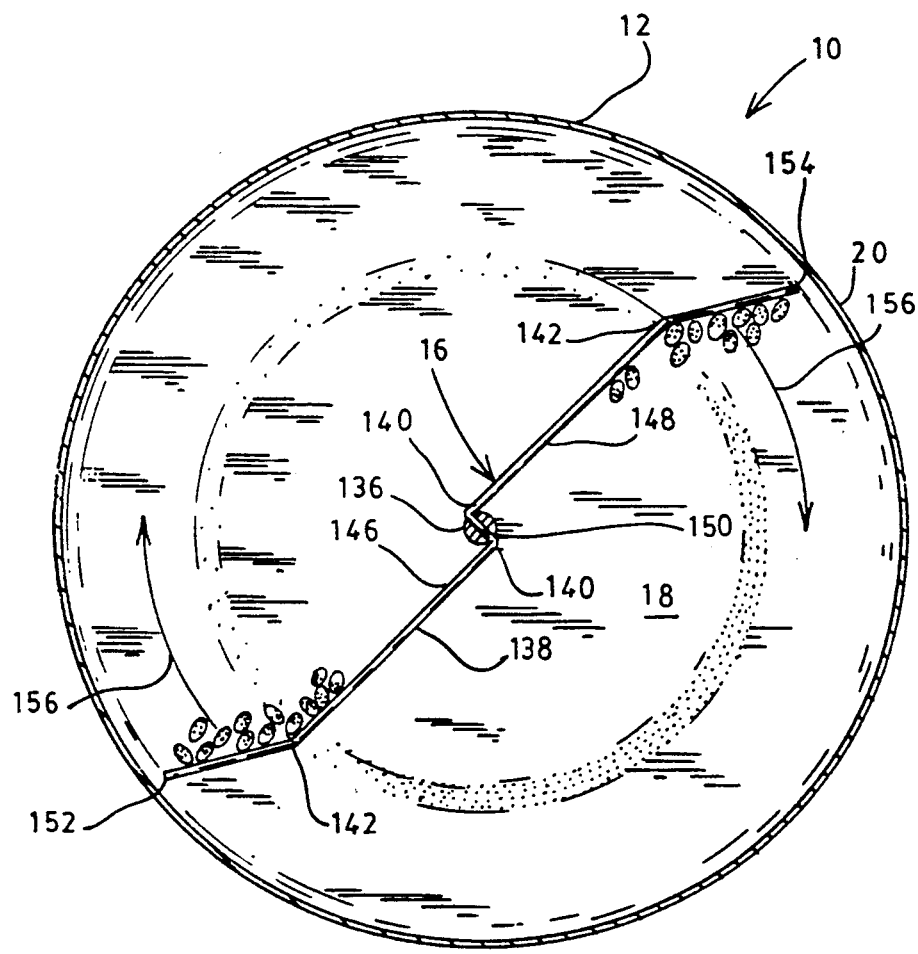
FIG. 4 is a top elevation view, in section, taken at 4—4 of FIG. 3 showing the floating stirring rod journaled within the stirring shaft and engaging unpopped popcorn kernels.

A popcorn popper incorporating various features of the present invention is illustrated generally at 10 in the figures. The popcorn popper 10 is designed for more effectively popping popcorn by agitating the popcorn during the heating process with a floating stirring system, the floating stirring system being designed to avoid jamming while the popcorn is being agitated and popped. Moreover, in the preferred embodiment the popcorn popper 10 is designed to draw unpopped kernels to the center of the popping surface, including those kernels which tend to remain about the periphery.

The popcorn popper includes a popcorn receptacle 12 into which unpopped kernels are placed for popping. The popcorn receptacle 12 has a substantially flat bottom 18 and a side wall 20. The side wall 20 defines an inner diameter 30 and a height 34. The side wall 20 further defines an opening 32 about the top portion 21 and a volume 36. A lip 22 is located about the top portion 21 of the side wall 20 and includes an outwardly extending portion 24 and an upwardly extending portion 26 such that an inner lip diameter 38 is defined to be larger than the inner wall diameter 30. In the preferred embodiment, the popcorn receptacle 12 is fabricated from a rigid material with a high heat conductivity such as metal or metal alloys.

A lid assembly 14 is releasably secured to the popcorn receptacle 12 for retaining the heat used for popping the corn and for retaining the popped corn. In the preferred embodiment, the lid assembly 14 includes a spine 40 with a first end 42 and a second end 44. A first side wall 46 and a second side wall 48 are located on opposing sides of the spine 40 and are downwardly disposed. The spine 40 is dimensioned to be received within the lip 22 of the popcorn receptacle 12 such that as the first and second ends 42 and 44 of the walls 46 and 48 engage the outwardly extending portion 24 of the lip 22, the bottom surface 52 of the spine 40 is elevated above the lip 22. The spine 40 of the preferred embodiment is fabricated from a rigid or semi-rigid material such as metal and for ease of construction may be formed by a stamping process.

A first door 54 and a second door 56 are connected to the bottom portion of the side walls 46 and 48 of the spine 40, respectively. Each door 54 and 56 has a substantially semicircular configuration such that as the doors 54 and 56 are in a closed position, the lid assembly 14 substantially covers the opening 32 of the popcorn receptacle 12, With the doors 54 and 56 engaging the outwardly extending portion 24 of the lip 22. The doors 54 and 56 of the preferred embodiment are fabricated from a rigid or semi-rigid material such as metal and for ease of construction may be formed by a stamping process. In the preferred embodiment, the doors 54 and 56 are each connected to the spine 40 with a hinge 58. For ease of construction, this hinge 58 is preferably comprised of cooperating tabs 53 extending from the walls 46 and 48 about the first and second ends 42 and 44, at least one tab 59 extending from the cooperating edge of each door 54 and 56, and a hinge pin 57 about which the tabs 53 and 57 are deformed. In the preferred embodiment, the doors 54 and 56 include at least one vent 60 for venting steam from the popcorn vessel 12 during popping. Each vent 60 is defined by a vertical opening formed by providing a slit 61 in the door 54 and 56 and upwardly displacing a portion of the material on one side of the slit 61 such that steam is forced out of the door 54 and 56 in a direction away from the user. To assist in opening the doors 54 and 56, each door 54 and 56 of the preferred embodiment is provided with a handle 62 attached with a connector (not shown) about the outer portion. In the preferred embodiment, each door 54 and 56 further includes at least one raised portion 66, each raised portion 66 being provided to strengthen the doors 54 and 56 against unselected bending. The first door 54 is provided with a closing device 68 to prevent the door 54 from opening as the popcorn popper 10 is tilted for the removal of popcorn. In the preferred embodiment, the closing device 68 is a spring 69 fabricated from a resilient material such as sheet metal deformed to cooperate with the contour of the lip 22, the spring 69 being biased toward the center of the popcorn popper 10 such that the door 54 may be selectively opened and closed. In this embodiment, the spring 69 is situated between the handle 62 and the door 54 such that the connector (not shown) holds the spring 69 in place as well as the handle 62.

A fastening means 70 is provided for selectively securing the lid assembly 14 to the popcorn receptacle 12. In the preferred embodiment the fastening means 70 is a continuous member fabricated from a resilient material and dimensioned to be received underneath the spine 40 between the first and second side walls 46 and 48. In this embodiment, the fastening means 70 is connected to the spine underneath 52 with a plurality of fasteners 78, the fasteners 78 being rivets, bolts, or the like. The fastening means 70 includes a first end 72 and a second end 76, the first end having an extended section 74. In the preferred embodiment, each end 72 and 76 has a Z-shaped configuration to cooperate with the contour of the lip 22 of the popcorn receptacle 12 such that when the ends 72 and 76 are engaged with the lip 22, the lid assembly 14 is held selectively in place. The first end extended section 74 is provided to act as a lever to aid in placement and removal of the lid assembly 14.

A stirring assembly 16 is provided for agitating the popcorn in the popcorn receptacle 12. The stirring assembly 16 includes a first handle 80 attached to the spine 40 of the lid assembly 14 about the first end 42. For simplicity of construction, in the preferred embodiment the handle 80 is mounted to an extended portion 82 of the spine 40, the extended portion 82 being upwardly disposed such that the handle 80 extends radially away from the popcorn receptacle 12. The handle 80 of the preferred embodiment is fabricated from a heat resistant material such as wood, and is fastened to the mount 82 with a screw-type fastener or the like. The handle 80 defines a through hole 90 opening on the first and second ends 86 and 88, the through hole 90 being dimensioned to cooperate with a hole 92 defined by the mount 82 such that a drive shaft 94 may be journaled therein. The drive shaft 94 has a first end 96 and a second end 98, the second end 98 being journaled through a hole 116 defined by a second end support 114 mounted to the spine 40. In the preferred embodiment the second end support 114 is mounted to the spine 40 with fasteners 78 used also to mount the lid assembly fastening means 70 to the spine 40. The drive shaft 94 defines a first bend 100 and a second bend 102 about the first end 96 such that the first end is displaced from the longitudinal axis of the first handle 80 and extends radially from the popcorn receptacle 12. A head 104 is connected to the first end 96 such that a second handle 106 may be journaled on the drive shaft 94 proximate the first end 96 between the head 104 and the first bend 100. The handle 106 of the preferred embodiment is fabricated from a heat resistant material such as wood. A bevel pinion 120 is connected to the drive shaft second end 98. In the preferred embodiment, the drive shaft 94 and bevel pinion 120 are fabricated from a rigid or semi-rigid material such as metal or plastic.

A stirring shaft 124 is provided to cooperate with the drive shaft 94 to transfer the torque generated to a stirring rod 138. The stirring shaft first end 126 includes a bevel gear 122 which acts to transfer torque from the drive shaft 94 to the stirring shaft 124. The stirring shaft 124 is journaled through an opening 30 in the spine 40 proximate the center and a hole 134 defined by a stirring shaft support 132 and extends proximate the bottom 18 of the popcorn receptacle 12. The stirring shaft support 132 of the preferred embodiment is located on the underneath surface 52 of the spine 40. In this embodiment, the stirring shaft support 132 has a substantially U-shaped configuration and is integrated with the lid assembly fastener strip 70. A through hole 136 is defined by the stirring shaft second end 128 such that a stirring rod 138 may be journaled therein. In the preferred embodiment, the stirring shaft 124 and bevel gear 122 are fabricated from a rigid or semi-rigid material such as metal or plastic.

A stirring rod 138 is provided to agitate the popcorn kernels and inhibit unpopped kernels to fall to the bottom surface 18 of the popcorn receptacle 12. The stirring rod 138 of the preferred embodiment is journaled proximate the middle portion 150 within the through hole 136 defined by the second end 128 of the stirring shaft 124 and includes a first and second leg 146 and 148. The first and second legs 146 each define a first bend 140 proximate the stirring shaft 124 such that the stirring rod 138 is restrained from movement along the longitudinal axis of the through hole 136 while allowing vertical rotation of the stirring rod 138. A second bend 142 is defined by each of the first and second legs 146 and 148. The bends 142 are located toward the ends 152 and 154 of the first and second legs 146 and 148, respectively, and are substantially horizontal and in the stirring direction denoted by arrow 156. Third bends 144 are defined by each of the first and second legs 146 and 148 proximate the ends 152 and 154 and are substantially vertical. The third bends 144 are dimensioned to cooperate with the contour of the popcorn receptacle side wall 20 to prevent the stirring rod 138 from jamming and to prevent popcorn kernels from remaining along the periphery. In the preferred embodiment the stirring rod 138 is fabricated from a resilient material such as metal wire such that the popcorn kernels will not jamb the stirring rod 138 but will deform the stirring rod 138 such that a kernel may pass underneath, the stirring rod 138 then resuming its original shape and moving the kernels on the subsequent rotation.

From the foregoing description, it will be recognized by those skilled in the art that a popcorn popper offering advantages over the prior art has been provided. Specifically, the popcorn popper is designed for more effectively popping popcorn by agitating the popcorn during the heating process with a floating stirring system, the floating stirring system being designed to avoid jamming while the popcorn is being agitated and popped and to draw unpopped kernels to the center of the popping surface, including those kernels which tend to remain about the periphery.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, We claim:

1. An improved popcorn popper for more efficiently popping popcorn kernels, said popcorn popper comprising:
   a popcorn receptacle for receiving unpopped popcorn kernels and retaining said kernels at least throughout the popping process, said popcorn receptacle having a substantially flat bottom surface, a substantially cylindrical peripheral wall and a central axis substantially perpendicular to said bottom surface;
   a covering means for preventing said popcorn from unselectively exiting said popcorn receptacle;
   an agitating means for preventing said kernels from sticking to said popcorn receptacle during said popping process, said agitating means including a rotatable shaft positioned such that it is parallel to said central axis of said popcorn receptacle, said rotatable stirring shaft having a first end adjacent the covering means and a distal end in close proximity to said bottom surface which is provided with a transverse through hole proximate said distal end, said agitating means further including a floating stirring rod pivotally journaled in said through hole of said stirring shaft so as to prevent jamming of said stirring rod by kernels on said bottom surface of said receptacle, said stirring rod configured to push said unpopped kernels toward said center axis of said popcorn receptacle, said stirring rod having a first portion extending on one side of said stirring shaft to proximate said peripheral wall and a second portion that is integrally formed with said first portion extending from a second side of said stirring shaft to proximate said peripheral wall, said first and second portions of said stirring rod each having bends proximate said stirring shaft, in a plane parallel to said bottom surface, to prevent axial movement of said stirring rod in said through hole, said bends being integrally connected by a portion of the stirring rod which is pivotally journaled in said through hole and which is generally perpendicular to the portion of said first and second portions adjacent their respective bends; and
   a handle for engaging a user's hand to stabilize said popcorn receptacle during said popping process and while transporting said popcorn receptacle.

2. The improved popcorn popper of claim 1 wherein said covering means includes at least one hingeably attached door for selectively opening said popcorn receptacle.

3. The improved popcorn popper of claim 2 wherein said at least one door is provided with a handle for facilitating opening and closing of said door.

4. The improved popcorn popper of claim 2 wherein said at least one door includes at least one vent for allowing escape of steam during said popping process.

5. The improved popcorn popper of claim 2 wherein said at least one door is provided with a fastening means for selectively securing said door to said popcorn receptacle for preventing unselected opening.

6. The improved popcorn popper of claim 2 wherein said at least one door is provided with a reinforcing means for preventing bending of said door.

7. The improved popcorn popper of claim 1 wherein said agitating means further includes a drive shaft, said drive shaft cooperatively connected with said stirring shaft by a bevel pinion and gear such as to rotate the stirring shaft and said floating stirring rod as said drive shaft is rotated.

8. The improved popcorn popper of claim 1 wherein said floating stirring rod is fabricated from a resilient material to prevent said floating stirring rod from jamming.

9. The improved popcorn popper of claim 8 wherein said resilient material is metal.

10. The improved popcorn popper of claim 1 where said floating stirring rod is deformed, intermediate said central axis and said peripheral wall of said receptacle, in a plane parallel to said bottom surface in the direction of rotation of said stirring shaft to counteract tangential forces and pull unpopped kernels toward the central axis of said popcorn receptacle.

11. The improved popcorn popper of claim 1 wherein said floating stirring rod defines opposite distal ends and each of said distal ends is deformed in a direction generally parallel to said central axis to prevent jamming of said floating stirring rod with said popcorn receptacle peripheral wall and to prevent said popcorn kernels from sticking to said peripheral wall of said popcorn receptacle.

12. An improved popcorn popper for more efficiently popping popcorn kernels, said popcorn popper comprising:
   a popcorn receptacle for receiving unpopped popcorn kernels and retaining said kernels at least throughout the popping process, said popcorn receptacle having a substantially flat bottom surface, a substantially cylindrical peripheral wall and a central axis substantially perpendicular to said bottom surface;
   a covering means for preventing said popcorn from unselectively exiting said popcorn receptacle, said covering means including a plurality of hingeably attached doors for selectively opening said popcorn receptacle, each of said doors being provided with a handle for facilitating selective opening and closing of said doors, at least one vent in each of said doors for allowing escape of steam during said popping process, and a reinforcing means in each door for preventing bending of said doors, at least one of said doors being further provided with a fastening means for selectively securing said door to said popcorn receptacle for preventing unselected opening;
   an agitating means for preventing said kernels from sticking to said popcorn receptacle during said popping process, said agitating means including a drive shaft, a stirring shaft having a distal end extending toward said popcorn receptacle bottom surface, said distal end being provided with a transverse through hole, and a floating stirring rod having a first portion extending on one side of the stirring shaft and a second portion integrally formed with said first portion and extending from a second side of said stirring shaft and which is fabricated from a resilient metal pivotally journaled in said through hole and provided with bends proximate said stirring shaft to prevent axial movement of said stirring rod through said through hole such that said floating stirring rod may engage said popcorn kernels along said popcorn receptacle bottom surface and may pivot in said through hole to prevent jamming of said floating stirring rod with said popcorn kernels, said bends being integrally connected by a portion of the stirring rod which is pivotally journaled in said through hole and which is generally perpendicular to the portion of said first and second portions adjacent their respective bends, said drive shaft and stirring shaft cooperatively joined by a bevel pinion and gear such as to rotate said floating stirring rod as said drive shaft is rotated, said floating stirring rod being deformed intermediate said stirring shaft and said peripheral wall in a plane substantially parallel to said bottom surface in a stirring direction to counteract tangential forces and pull said unpopped kernels toward center axis of said popcorn receptacle and being further deformed at distal ends in a direction substantially parallel to said center axis to prevent jamming of said floating stirring rod with said popcorn receptacle peripheral wall and to prevent said popcorn kernels from sticking to said peripheral wall of said popcorn receptacle; and a handle for engaging a user's hand to stabilize said popcorn popper receptacle during said popping process and while transporting said popcorn popper receptacle.

13. The improved popcorn popper of claim 12 wherein said handle is fabricated from a thermally non-conductive material.

14. The improved popcorn popper of claim 13 wherein said thermally non-conductive material is wood.

15. The improved popcorn popper of claim 12 wherein said popcorn receptacle is fabricated from a rigid, thermally conductive material.

16. The improved popcorn popper of claim 15 wherein said material is metal.

* * * * *